United States Patent Office 3,183,015
Patented May 11, 1965

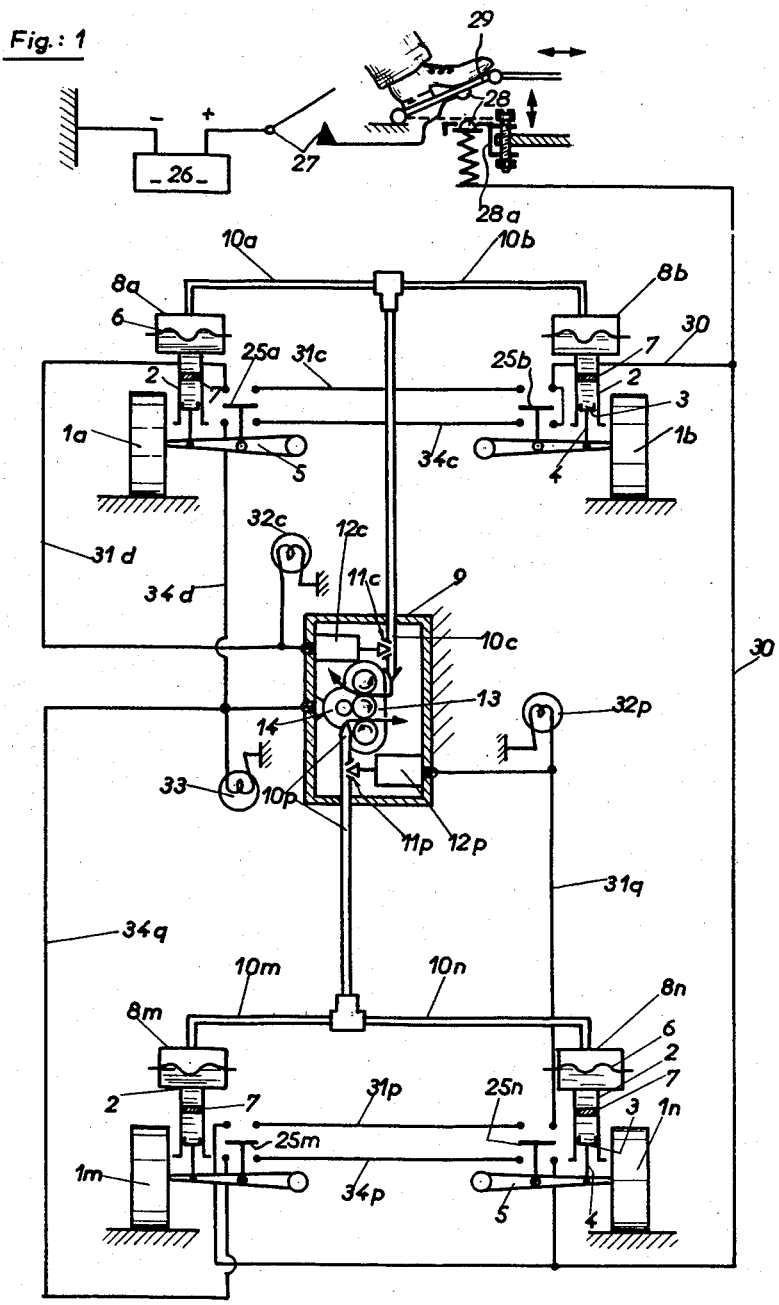

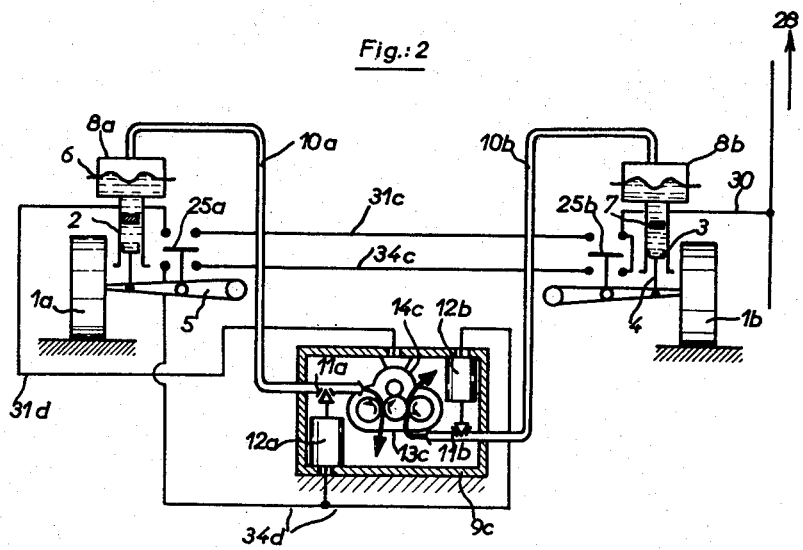
Fig.: 2
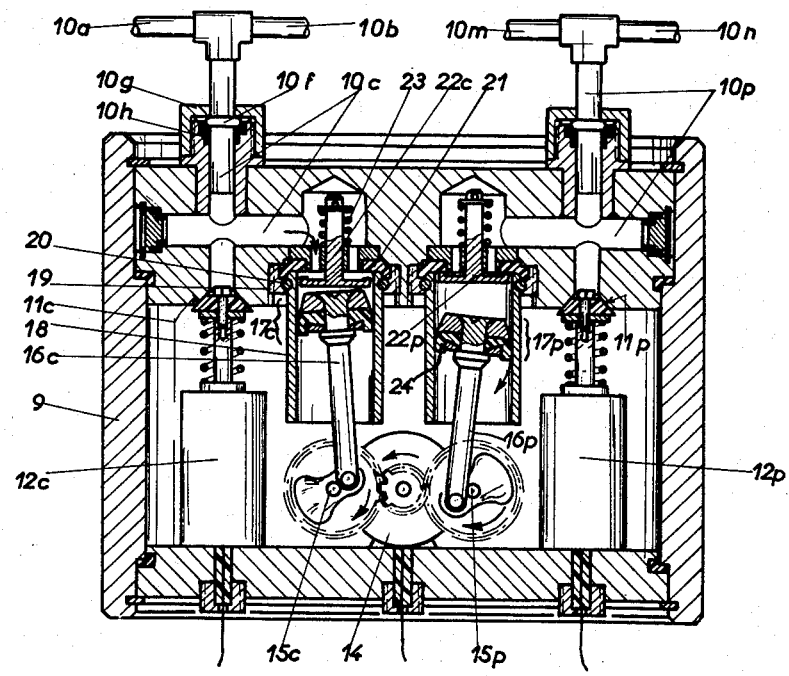
Fig.: 3

3,183,015
LEVEL CORRECTING SYSTEMS FOR VEHICLES HAVING OLEOPNEUMATIC OR LIKE SUSPENSION SYSTEMS
Fernand Stanislas Allinquant, 53 Ave. le Notre, Sceaux, France
Filed Nov. 29, 1963, Ser. No. 326,951
Claims priority, application France, Dec. 5, 1962, 917,636
10 Claims. (Cl. 280—6.1)

The invention relates to level correcting systems for vehicles having oleopneumatic or like suspension systems.

Oleopneumatic and pneumatic suspensions for vehicles are generally provided with level correctors, which are arrangements detecting the mean relative position of the wheels and other unsuspended parts of the vehicle with respect to the body or suspended part and which control the placing in reserve or, on the other hand, the use in the suspension of a greater or lesser quantity of fluid under pressure.

Level correctors as commonly employed are generally mechanical and comprise resilient linking means connecting an unsuspended part of the vehicle to a valve or the like equipped with a delay device. The object of the latter is to prevent level-correction occurring too frequently, as a result of transitory variations of level (such as dipping which occurs on braking, for example). Overfrequent level-correction would cause too great a consumption of energy by the suspension. For the sake of simplification and economy of cost, it is usual to employ a single level corrector per axle, such corrector being disposed at, for example, the mid-point of a transverse anti-roll bar.

In theory, the valve controlled by the level corrector opens when the said mid-point is located beyond or on the near side of a neutral range or region corresponding to the normal level of the vehicle and remains outside the said range during a period exceeding the delay time. In practice, the level corrector operates step-wise and detects a mean value; the latter, however, depends on the construction of the corrector. Fine adjustment of the delay would therefore have to take place on the vehicle itself, which would make the adjustment difficult, particularly in view of the position of the corrector or correctors, which are located in the vicinity of the axles; makers of correctors must therefore generally content themselves with effecting a prior mean adjustment in the factory.

The present invention has as its principal object to reduce, or even to eliminate, the drawbacks referred to above.

The invention consists in disposing in series a plurality of level correctors each associated with one wheel, in order to control an oleopneumatic or pneumatic suspension. Advantageously, these correctors can operate on a make and break basis and may comprise valves or switches of very simple type, which must all be in the same correction position, such as that indicating the "too high" condition for example, before a level-correcting movement can occur.

Such a system of correctors in actual fact substitutes the probability of displacement of two wheels at least, for that of the displacement of the mid-point of an axle, which is currently employed as a determining factor for level correction; it will be understood that the said probability of displacement is smaller in the first case than in the second. The result is that the usual delay devices can be replaced by a very much simplified device, possibly connected to an element having a movement of a random nature, different from that of the wheels, this device advantageously being common to the whole of the suspension and being readily adjustable.

A switch actuated by the accelerator pedal may thus be sufficient to achieve the desired intermittent operation, particularly in the case of an oleopneumatic suspension having electrical height-correction and of the closed type, containing a gas of variable mass and pressure, which pressure preferably remains, in the operative portion of a suspension element, below a predetermined value. The principle of such a suspension is described in my U.S. Patent No. 2,987,312, and an improved electrical feed circuit which can, with advantage, be applied thereto forms the subject of my copending French application S.N. 326,952 of even date. The level correctors used in such a suspension have a simple function of detection and they control separate transfer means communicating with a closed chamber and subjected only to the difference between the effective pressure of operation of the jacks of the suspension and the pressure prevailing in the said chamber, which provides a gas reserve.

The description which follows, with reference to the accompanying drawings, and which is given by way of non-limitative example only, will enable the various features of the invention and the manner of carrying them into effect to be clearly understood. In the drawings:

FIGURE 1 is a diagram of an oleopneumatic suspension system employing a variable volume of gas and embodying the invention;

FIGURE 2 is a diagram of a modified construction;

FIGURE 3 shows, in greater detail, the construction of the transfer device which is controlled by the level correctors.

Referring to FIGURE 1, there can be seen therein, in diagrammatic form and solely by way of example, an oleopneumatic suspension system in accordance with U.S. Patent No. 2,987,312 referred to above, which suspension system is of the type having a variable gas volume and is fed electrically.

The suspension comprises jacks 2 one associated with each wheel, each said jack being constituted by a cylinder space provided by a part which, advantageously, is integral with the vehicle-body and by an oscillating piston 3, the rod 4 of which is articulated to an arm 5 carrying the wheel 1. A flexible diaphragm 6 separates the liquid contained in the jack from a mass of compressed gas which acts as a spring, a partition 7 provided with calibrated passages serving to damp the movements of the liquid. The piston 3 and rod 4 may, therefore, be called compensating means while the piston bore in which the piston slides comprises a compensating chamber. The diaphragm 6 and the liquid between it and the piston may be called pressure responsive means since they respond to pressure in the pressure chamber above the diaphragm.

The chamber 8 associated with each jack contains the diaphragm 6 and is connected by a piep 10 to a casing 9 which forms a reserve of gas under pressure and which contains transfer means causing the said gas to pass from the casing 9 to the chamber 8 and vice versa. In FIGURE 1, the two chambers 8a and 8b associated with the jacks appertaining to the wheels 1a, 1b of the front axle, are connected to the casing 9 by a T-shaped pipe 10, the common branch 10c of which is extended within the casing and carries a seat 11c for an electric valve 12c, before terminating in a connection with a compressor 13. Likewise, the chambers 8m and 8n appertaining to the rear axle are connected to the casing 9 by a second T-shaped pipe, the common branch 10p of which is extended within the casing and carries a seat 11p for an electric valve 12p, before terminating at the compressor 13.

In order to simplify FIGURE 1, the compressor 13, which is driven by an electric motor 14 and has the special feature of possessing two independent gas circuits, has been represented in FIGURE 1 purely diagrammatically, as a pump consisting of double gear wheels. The true construction of the compressor is made clear in FIGURE 3.

In FIGURE 3 there can be seen an electric motor 14 which drives two crankshafts 15c, 15p in phase opposition, each of these shafts in turn driving the rod 16c or 16p of a piston 17c or 17p sliding in a jacket such as 18. A valve 22c or 22p having a resorting spring such as 23 is disposed above each piston. When a valve opens (as shown by the valve 22c for example), it permits the associated piston 17c to draw in a part of the gas contained in the pipe 10c during its descending stroke, while it closes again on the ascent of the piston (as shown by the valve 22p for example). The compressed gas escapes around the corresponding piston 17p, the packing disc of which has a flexible lip 24 directed away from the piston, in the direction towards the piston rod 16 thereof.

The suspension shown in FIGURE 1 and fully described with reference thereto is controlled by a level-correcting system, the control of which is electrical.

Referring again to FIGURE 1, with each suspension arm 5 there is associated a switch, which may also be referred to as a height corrector. This switch is normally open but is adapted to close a first circuit in the upwardly deflected position of the arm 5 and a second circuit in the downwardly deflected position thereof. It may be assumed either that the movable element 25 of this switch is conductive and resilient or—and this amounts to the same thing—that the terminals between which a locally conductive bar is vertically movable are resilient in the horizontal direction; in any event, the essential characteristic of such a switch is that it operates practically speaking on an all-or-nothing basis.

The battery 26 of the vehicle is connected on the one hand to earth and, on the other hand, to the supply circuit for the transfer means 12, 13 through the medium of a main switch 27 located on the dashboard and a switch 28 actuated by the accelerator pedal 29. The switch 28 is closed beyond a certain travel of the pedal 29, which limit is adjustable by means of a screw stop 28a for example.

The height correctors of the respective front and rear pairs 25a, 25b and 25m, 25n are connected in series in the arrangement shown in FIGURE 1. The conductor 30 coming from the battery can therefore be connected, by way of conductors 31c, 31d, to the front electric valve 12c and to an associated indicator lamp 32c, while the conductors 31p, 31q connect it, if required, to the rear electric valve 12p and to the associated indicator lamp 32p; finally, it can also be connected to the motor 14 and to its indicator lamp 33 through the medium of the conductors 34c and 34d or 34p and 34q.

A suspension of this kind operates in the following manner:

When the main switch 27 is closed and the driver applies sufficient pressure to the accelerator pedal to close the contact 28, the simultaneous raising of the two wheels on the same axle (the front wheels 1a, 1b for example) beyond the neutral range corresponding to the normal level of the vehicle results in the simultaneous closing of the two switches 25a, 25b associated with these wheels. This results in opening of the associated electric valve 12c and the transfer of gas from the casing 9 to the chambers 8a, 8b. This transfer lasts until the normal level is reached again, which results in the opening of at least one of the switches 25. Conversely, the simultaneous lowering of the wheels 1a, 1b to a point on the near side of, or below, the range corresponding to the normal level of the vehicle results in energisation of the motor 14 connected to the double compressor 13. The latter draws gas from the chambers 8a, 8b. Such gas is delivered to the casing 9, which forms a reserve chamber. The corresponding movement which reduces the below-body-shell height may be relatively slow and the rate of delivery of the compressor may be below that of an electric valve. Consequently the simultaneous variation of the height at the front and rear of the vehicle is not of great importance, the electric valve 12p (in the example chosen) nullifying the undesirable variation produced at the rear if this proves to be necessary. Operation is identical in the case of the rear axle, only the wiring being different. In any case, the right-hand and left-hand wheels function in similar roles and the transfer means in question functions only if both these wheels and the two associated correctors simultaneously leave the neutral range or region.

It is an easy matter to adjust the travel of the switch 28, connected to the accelerator pedal, in such manner that the indicator lamps 32, 33 associated with each transfer means function with a frequency and for a given time which depend on the individual driver and which the driver can even seek to reduce to the minimum by himself rectifying the adjustment of the stop 28a.

It is obvious that the principle of using switches having a random all-or-nothing mode of operation and disposed in series in accordance with the essential characteristic of the invention extends to hydraulic switches as well as to electric switches, and also to oleopneumatic suspensions in which the operative oil volume varies and even to purely pneumatic suspensions. Moreover, the invention also covers embodiments which comprise more than two level correctors disposed in series and which are adapted to use one electric valve for each wheel, one compressor for each axle and a plurality of separate casings each forming a reserve chamber for compressed gas. An alternative construction of this kind is shown in FIGURE 2.

What is claimed is:

1. In combination with a vehicle having a body, an accelerator pedal, an electrical generator and wheels each supporting said body by means of a pneumatic suspension element, an improved level correcting device comprising a reservoir filled with gas, an electric motorpump in said reservoir for simultaneously transferring when energized gas from two suspension elements corresponding to a same end of the vehicle into the reservoir at an overpressure, an electrovalve at least in said reservoir for simultaneously transferring when energized gas from the reservoir into said two suspension elements, electric wheel switches mounted between said body and each wheel respectively for detecting the relative location thereof, two wheel switches corresponding to a same end of the vehicle and furthermore a main switch controlled by the accelerator pedal being connected in series between said electrical generator and said motorpump and electrovalve respectively, for alternately energizing said motorpump and said electrovalve but only when the main switch is closed and the two wheel switches furthermore have similar closure positions.

2. In combination with a vehicle having a body, an accelerator pedal, an electrical generator and wheels each supporting said body by means of an oleopneumatic suspension element, an improved level correcting device comprising a reservoir filled with gas, an electric motorpump in said reservoir for simultaneously transferring when energized gas from two suspension elements corresponding to a same end of the vehicle into the reservoir at an overpressure, an electrovalve at least in said reservoir for simultaneously transferring when energized gas from the reservoir into said two suspension elements, electric wheel switches of the make-and-break type mounted between said body and each wheel respectively for detecting the relative location thereof, two wheel switches corresponding to a same end of the vehicle and furthermore a main switch controlled by the accelerator pedal being connected in series between said electrical generator and said motorpump and electrovalve respectively, for alternately energizing said motorpump and said electrovalve but only when the main switch is closed and the two wheel switches furthermore have similar closure positions.

3. In combination with a vehicle having a body, an accelerator pedal, an electrical generator and wheels each supporting said body by means of a pneumatic suspension element, an improved level correcting device comprising a reservoir filled with gas, an electric motorpump in said reservoir for separately but simultaneously transferring when energized gas from two suspension elements corresponding to a same end of the vehicle into the reservoir at an overpressure, said motorpump having two separate outlets respectively connected by pipe means to each suspension elements of said same end, two electrovalves in said reservoir for simultaneously transferring when energized gas from the reservoir into said pipe means respectively, electric wheel switches mounted between said body and each wheel respectively for detecting the relative location thereof, two wheel switches corresponding to said same end of the vehicle and furthermore a main switch controlled by the accelerator pedal being connected in series between said electrical generator and both two electrovalves respectively, for alternately energizing said motorpump and both said electrovalves but only when the main switch is closed and the two wheel switches furthermore have similar closure positions.

4. In combination with a vehicle having a body, an accelerator pedal, an electrical generator and wheels each supporting said body by means of a pneumatic suspension element, an improved level correcting device comprising a reservoir filled with gas, an electric motorpump in said reservoir for simultaneously transferring when energized gas from front and rear elements separately into the reservoir at an overpressure, said motorpump having two separate outlets respectively connected by common pipe means to both suspension elements corresponding to a same end of the vehicle, two electrovalves in said reservoir for transferring when individually energized gas from the reservoir into said pipe means respectively, electric wheel switches mounted between said body and each wheel respectively for detecting the relative location thereof, two wheel switches corresponding to each end of the vehicle and furthermore a main switch controlled by the accelerator pedal being connected in series between said electrical generator and said motorpump and electrovalves respectively for alternately energizing said motorpump and one of said electrovalves but only when the main switch is closed and the two wheel switches corresponding to a same end of the vehicle furthermore have similar closure positions.

5. In combination, a vehicle comprising two front and two rear wheels suspendingly supported from a body, a suspension system comprising a suspension jack for each of said wheels, said jack comprising a chamber portion which is connected to said vehicle body, said chamber portion comprising a pressure chamber, and a compensating means connected to each of said wheels, said means being movable in accordance with vertical movement of said wheels relative to said body, pressure responsive means in said chamber portion movable in response to pressure in said chamber portion, said pressure responsive means engaging and acting against said compensating means, a pressure reservoir, a pump, said pump discharging into said reservoir, a first conduit means connecting the two front wheel pressure chambers to the suction side of said pump and also into said reservoir, a second conduit means connecting the two rear wheel pressure chambers to the suction side of said pump and also into said reservoir, said first and second conduit means each comprising respectively, a first and second valve means closing off the respective front and rear wheel pressure chambers from said reservoir, a control system for opening said first and second valves and for actuating said pump, said control system being responsive to open said first valve means upon both said front wheels being displaced simultaneously relative to said body in a certain vertical direction, said control system being responsive to open said second valve means upon both said rear wheels being displaced simultaneously relative to said body in said certain vertical direction, said control system being responsive to actuate said pump upon either both said front wheels or both said rear wheels simultaneously being displaced relative to said body in an opposite vertical direction, a pressurized fluid filling said reservoir and said pressure chambers.

6. The combination of claim 5, wherein each of said chamber portions comprises a compensating chamber opposed to said pressure chamber and separated therefrom by a diaphragm, said compensating chamber comprising a piston bore, said compensating means comprising a piston in said bore and connected to a said wheel, a fluid filling said compensating chamber.

7. The combination of claim 5, wherein said fluid is at a higher pressure in said reservoir than it is in said pressure chambers.

8. The combination of claim 6, wherein said fluid in said reservoir pressure and chambers is a gas while the fluid in said compensating chambers is a liquid.

9. The combination of claim 5, wherein said control system comprises electrical circuits, said circuits comprising an electrical switch means at each of said wheels, each of said switch means being connected to a wheel so as to be responsive to vertical movement of said wheel relative to said vehicle body, both front wheel switch means being connected in series and both rear wheel switch means being connected in series to their respective circuits, so that no one circuit is energised unless both of is related wheels, either both front or both rear, are simultaneously displaced in the same vertical direction relative to said vehicle body.

10. The combination of claim 9, wherein said vehicle is an engine driven vehicle and comprises an accelerator pedal and an electrical storage battery, a pedal switch operable by actuation of said pedal to close an electrical circuit from said battery to said control system circuits.

References Cited by the Examiner

UNITED STATES PATENTS

| | | | |
|---|---|---|---|
| 2,976,054 | 3/61 | Sahagian. | |
| 2,987,312 | 6/61 | Alliquant. | |
| 2,993,705 | 7/61 | D'Avigdor. | |
| 3,061,330 | 10/62 | Alfieri. | |
| 3,121,573 | 2/64 | Alfieri | 280—6 |
| 3,122,379 | 2/64 | Alliquant | 280—6.1 |

A. HARRY LEVY, *Primary Examiner.*